(12) United States Patent
Rutsch (10) Patent No.: US 7,120,984 B2
(45) Date of Patent: Oct. 17, 2006

(54) METHOD OF PRODUCING A LORDOSIS SUPPORT

(75) Inventor: Hermann W. Rutsch, Delbrück (DE)

(73) Assignee: Jorg Schwarzbich, Bielefeld (DE)

( * ) Notice: Subject to any disclaimer, the term of this patent is extended or adjusted under 35 U.S.C. 154(b) by 129 days.

(21) Appl. No.: 10/087,456

(22) Filed: Mar. 1, 2002

(65) Prior Publication Data

US 2002/0140124 A1    Oct. 3, 2002

(30) Foreign Application Priority Data

Mar. 2, 2001    (DE)    ............................... 101 10 138

(51) Int. Cl.
 B29C 45/14    (2006.01)
 B23P 11/126    (2006.01)

(52) U.S. Cl. .................. 29/527.1; 29/527.2; 29/527.4; 264/261; 264/275; 264/277; 264/279; 264/279.1; 297/284.4

(58) Field of Classification Search ............. 29/527.1, 29/527.2, 527.4; 264/261, 275, 277, 279, 264/279.1; 297/284.1, 284.4
See application file for complete search history.

(56) References Cited

U.S. PATENT DOCUMENTS

| | | | | |
|---|---|---|---|---|
| 2,596,993 | A * | 5/1952 | Gookin ....................... 264/275 |
| 3,264,034 | A | 8/1966 | Lawson | |
| 3,389,461 | A * | 6/1968 | Hardart ....................... 29/848 |
| 3,391,426 | A * | 7/1968 | Hugill ....................... 425/129.1 |
| 3,458,931 | A * | 8/1969 | Carlson et al. ............... 29/884 |
| 3,470,598 | A * | 10/1969 | Berthelsen ............. 29/897.312 |
| 3,860,287 | A | 1/1975 | Platt | |
| 3,961,010 | A * | 6/1976 | Holmes ....................... 264/221 |
| 3,991,146 | A * | 11/1976 | Barrie ....................... 264/46.7 |
| 4,318,879 | A * | 3/1982 | Gartner ....................... 264/163 |
| 4,626,185 | A * | 12/1986 | Monnet ....................... 425/110 |
| 4,722,821 | A * | 2/1988 | Vermilye ..................... 264/273 |
| 4,785,523 | A * | 11/1988 | Koseki et al. ................. 29/530 |
| 4,860,425 | A * | 8/1989 | Kunisaki et al. ........... 29/527.4 |
| 5,165,754 | A | 11/1992 | Louys | |
| 5,190,803 | A * | 3/1993 | Goldbach et al. ............ 428/138 |
| 5,609,652 | A * | 3/1997 | Yamada et al. ................ 29/882 |
| 5,700,057 | A | 12/1997 | De Filippo | |
| 5,705,113 | A * | 1/1998 | Kane et al. ................... 264/261 |
| 5,769,491 | A * | 6/1998 | Schwarzbich ............ 297/284.4 |
| 5,920,986 | A * | 7/1999 | Brooks et al. ............. 29/893.2 |
| 5,934,752 | A * | 8/1999 | Klingler .................. 297/284.4 |
| 6,079,783 | A * | 6/2000 | Schuster et al. ......... 297/284.4 |
| 6,158,812 | A * | 12/2000 | Bonke ......................... 297/391 |
| 6,412,874 | B1 * | 7/2002 | Mayer .................... 297/452.52 |
| 6,493,939 | B1 * | 12/2002 | Ledingham .............. 29/898.15 |
| 6,758,522 | B1 * | 7/2004 | Ligon et al. ............. 297/284.4 |
| 2004/0169407 | A1* | 9/2004 | Ligon et al. ............. 297/284.4 |
| 2004/0245823 | A1* | 12/2004 | Ligon et al. ............. 297/284.4 |
| 2005/0173957 | A1* | 8/2005 | Schwarzbich et al. ... 297/284.4 |

FOREIGN PATENT DOCUMENTS

EP    0 780 262    6/1997
FR    2 532 883    3/1984

(Continued)

*Primary Examiner*—Essama Omgba
(74) *Attorney, Agent, or Firm*—Richard M. Goldberg (57) ABSTRACT

A method of producing a lordosis support (12) with a supporting element (22) of plastic of adjustable curvature at rods (18) of a lattice mat (10), formed by longitudinal and transverse rods (14, 16, 18), wherein the rods (14, 16, 18) are introduced into an injection mold (42, 44) for the supporting element (22) and, during the injection molding of the supporting element (22), are embedded in the latter.

12 Claims, 5 Drawing Sheets

FOREIGN PATENT DOCUMENTS

| | | |
|---|---|---|
| FR | 2 534 792 | 4/1984 |
| FR | 2 726 334 | 5/1996 |
| FR | 2 759 649 | 8/1998 |
| JP | 6292817 | 9/1987 |
| JP | 1214417 A * | 8/1989 |
| WO | WO 96/18326 * | 6/1996 |
| WO | WO 01/10670 | 2/2000 |
| WO | WO 0/110670 A1 * | 2/2001 |

* cited by examiner

METHOD OF PRODUCING A LORDOSIS SUPPORT

BACKGROUND OF THE INVENTION

The invention relates to a method of producing a lordosis support with a supporting element of plastic of adjustable curvature at rods of a lattice mat, formed by longitudinal and transverse rods.

A lordosis support is frequently incorporated in the backrest of seats, especially of motor vehicle seats. By adjusting the curvature, the lordosis support enables the contour of the backrest to be adapted to the anatomy of the user and to give a better support to the spine of the user. The supporting element of such a lordosis support is formed by a plastic plate, which is perforated variously and the upper and lower edges of which can be pulled together with the help of a Bowden cable, so that the plate is deflected and, by these means, its curvature is changed. The supporting element is fastened in the region of its upper and lower edges at transverse rods of a lattice mat, the function of which is to reinforce the backrest in the area. This lattice mat usually is formed by a wire lattice, which is suspended with compression or tension springs in the frame of the backrest, so that the longitudinal rods extend essentially vertically in the plane of the backrest. The transverse rods, consisting of thinner wires, are bent at the ends into eyelets, which embrace the longitudinal rods tightly and thus fasten the transverse rods to the longitudinal rods.

An example of a unit consisting of a lattice mat and a lordosis support of this type is described in the EP-A-O 780 262. For the production, the lattice mat and the supporting element initially are produced as separate components. The supporting element, formed by a plastic injection-molded part, is then fastened in a special step by locking it to the transverse rods of the lattice mat. For this purpose, the locking organs at the supporting element must be constructed so that, on the one hand, sufficiently stable fastening is assured and, on the other, the transverse rods can be locked in so that they can move easily so that, when produced on an industrial scale, the locking can be brought about in a short time and with a high degree of functional reliability.

SUMMARY OF THE INVENTION

It is an object of the invention to simplify the manufacture and fastening of the lordosis support to the lattice mat.

Pursuant to the invention, this object is accomplished owing to the fact that the rods are introduced in an injection mold for the supporting element and are embedded in the supporting element during the injection molding of the latter.

Pursuant to the invention, the production of the supporting element and its fastening to the lattice mat are integrated into a single step, so that the number of working and handling processes is reduced. Moreover, by embedding the rods of the lattice mat in the plastic of the supporting element, an extremely stable fastening is achieved.

Preferably, the transverse rods and/or the longitudinal rods of the lattice mat are encapsulated by molding with the plastic, so that a rigid connection results. Alternatively, eyelets can also be integrally molded while injection molding the supporting element or metal sliding bushes can be injected, into which the longitudinal rods of the lattice mat are then inserted. In this way, it is also possible to produce so-called four-way lordosis supports, for which not only the curvature but also the height of the supporting element relative to the lattice mat can be adjusted. Moreover, components of the adjusting mechanism can also be inserted into the injection mold and encapsulated by molding.

In a particularly preferred embodiment, the transverse rods of the lattice mat, before they are connected with the longitudinal rods, are supplied as endless material to the injection mold. For this purpose, the transverse rods can be advanced with one end against a stop, formed in the mold, and then cut off at the other end. Moreover, the cutting tool can be combined with the injection mold in such a manner, that the devices for producing the closing forces, required for keeping the injection mold closed, can also be used to actuate the cutting tool.

Since the transverse rods of the lattice mat are held in position in the inventive method by the injection mold or by the finished plastic part, the production of the lattice mat can also be simplified owing to the fact that the transverse rods are connected with the longitudinal rods only during or after the injection molding. The injection mold can also be used to hold those transverse rods in position, which are not embedded in the supporting element.

The longitudinal rods of the lattice mat can be fixed temporarily in their position owing to the fact that they are introduced into appropriate grooves in one half of the injection mold. The fastening of the transverse rods to the longitudinal rods can then be accomplished, as before, by forming eyelets, the bending tools, for producing the wire eyelets, being integrated in the injection mold. Alternatively, it is also possible to weld the transverse rods to the longitudinal rods. In this case, welding electrodes can also be integrated in the injection mold. Both variations of the method have the advantage that the cooling time between the injection of the plastic and the removal of the supporting element can be used for other steps, especially for fastening the transverse rods to the longitudinal rods.

Since the sharp edges of the ends of the wire at the fastening points of the transverse rods can easily lead to injuries or to scratches to other components during the later handling of the lattice mat, it is also advisable to encapsulate these fastening points by molding them with plastic. This encapsulation by molding can be accomplished with the same mold with which also the supporting element is produced and offers the additional advantage that the fastening of the transverse rods to the longitudinal rods is stabilized additionally. Alternatively, the connection between the longitudinal and the transverse rods can also be brought about solely by the encapsulation by molding.

Since the lattice mat is suspended with compression or tension springs in the backrest, suitable anchoring sites for the springs should be formed especially at the longitudinal rods. Previously, this was done by bending the longitudinal rods in the region of the anchoring sites. In the case of the inventive method, the bends in the longitudinal rods can also be produced with suitable bending devices in the injection mold. On the other hand, the inventive method also offers the possibility of forming these anchoring sites by plastic parts, which are molded to the longitudinal rods and into which the springs may be clipped, so that they cannot be lost.

For motor vehicles, active head rests have been developed which, in the event of a collision of the vehicle, automatically swivel forward in order to catch the head of the user, which is flung to the rear, as a result of the collision earlier and thus prevent a whiplash injury. The swiveling motion of the active headrests is initiated by an initiating element, which is incorporated in the backrest of the seat and responds to the pressure exerted on the upper part of the body of the user, when the latter is pressed against the backrest by the impact. The initiating element has a housing or other functional parts of plastic, which accommodate appropriate sensors and, like the supporting element of the lordosis support, are fastened to the lattice mat. The inventive method can therefore also be used analogously for fastening such functional parts of the initiating element to the lattice mat.

BRIEF DESCRIPTION OF THE DRAWINGS

In the following, examples of the invention are explained in greater detail by means of the drawing, in which.

DETAILED DESCRIPTION

Figure 1:
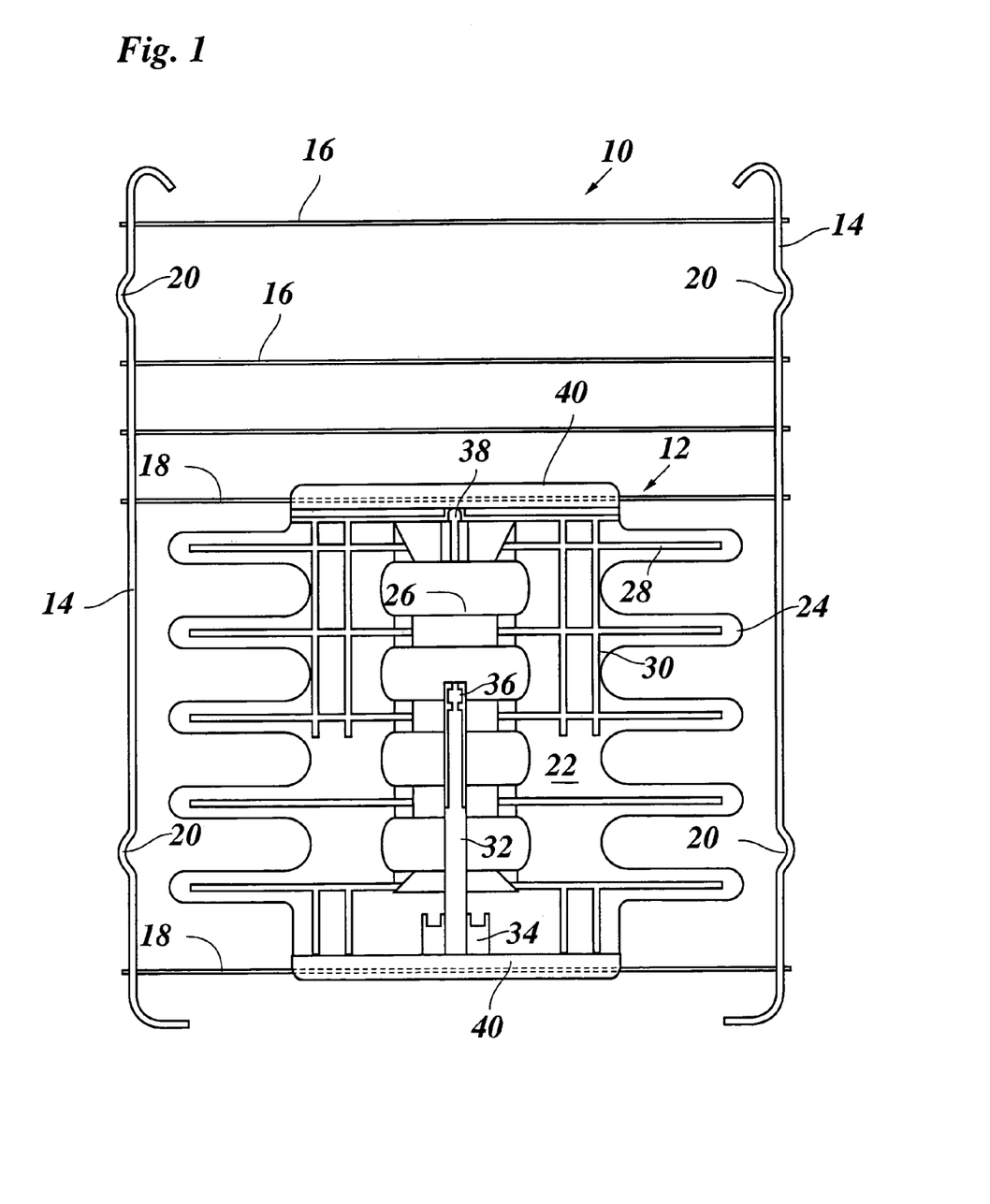
FIG. 1 shows a rear view of a lattice mat with a lordosis support of the invention.

FIG. 1 shows a lattice mat 10, to which a lordosis support 12 is attached. The lattice mat 10 is formed by two longitudinal rods 14, the ends of which are bent and which are connected to one another by rung-like transverse rods 16, 18. In the example shown, the longitudinal rods 14 are metal wires with a relatively large cross-section and a correspondingly high bending stiffness, whereas the transverse rods 16, 18 are formed by thinner metal wires or rods of flat steel. Each longitudinal rod 14 has two ends 20, which are anchoring sites for tension springs, which are not shown and with which the lattice mat 10 is suspended in the frame of a backrest of a seat, so that it lies essentially in the plane of the backrest in the upholstery and provides the required degree of stiffness and resiliency to the backrest. Alternatively, the longitudinal rods can also be formed as perforated flat strips, in the holes of which suspension springs are suspended.

The lordosis support 12 has an essentially plate-shaped supporting element 22 of plastic, which on both sides forms several, laterally protruding fingers 24 and is provided in the center with openings 26. The fingers 24 are reinforced at the rear by integrally molded ribs 28. The stiffness of the supporting element 22 is adjusted by ribs 30, which extend at right angles to the ribs 28 but are interrupted, so that the supporting element can be bent elastically about a transverse axis and, at the same time, arches more or less in the direction perpendicular to the plane of the drawing in FIG. 1. An essentially vertical lever 32 is disposed centrally on the rear of the supporting element 22 and mounted pivotably at its lower end in a bearing 34 at the supporting element. The upper end of the lever 32 forms an anchoring site 36 for the outer cable of a Bowden wire, which is not shown. An anchoring site 38 for the associated inner cable is disposed in the center of the upper edge of the supporting element 22. Consequently, the supporting element 22 can be compressed in the vertical direction with the help of the Bowden wire, so that it arches in the direction of the back of the user.

To fasten wire lattice 10, the supporting element has, at its upper and lower edges, thickenings 40, in which one of the transverse rods 18 is embedded. In this way, the supporting element 22 is held stably in the lattice mat 10 and cannot be pulled out. When the supporting element 22 is arched and, at the same time, shortened in the vertical direction, the transverse rods 18 are bent elastically. Since the transverse rods are embedded in the thickenings 40, they can also not be torn out of the supporting element under this stress.

Figure 2:
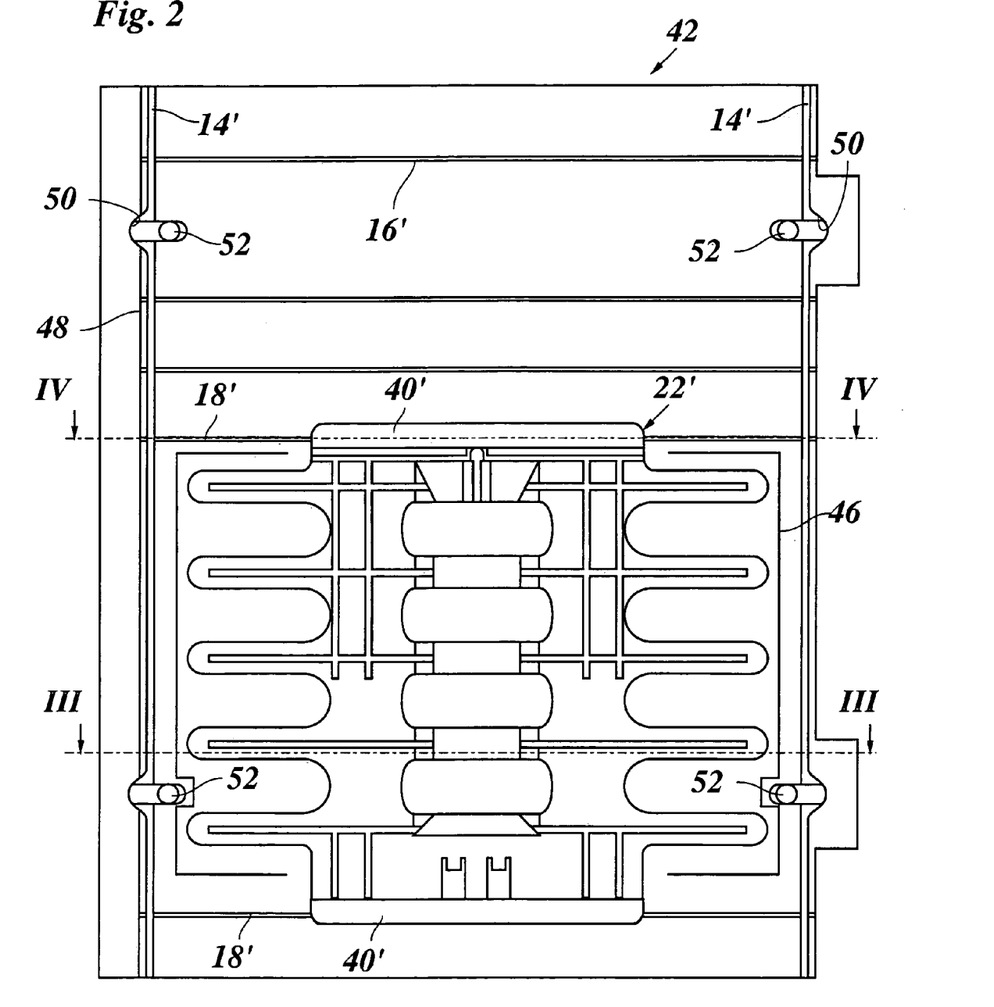
FIG. 2 shows a lower part of a mold of a device for injection molding of the lordosis support and, at the same time, for producing the lattice mat, in plan view, FIG. 3 a section through the lower part of a mold and an associated upper part of the mold along the line III—III in FIG. 2.
Figure 3:
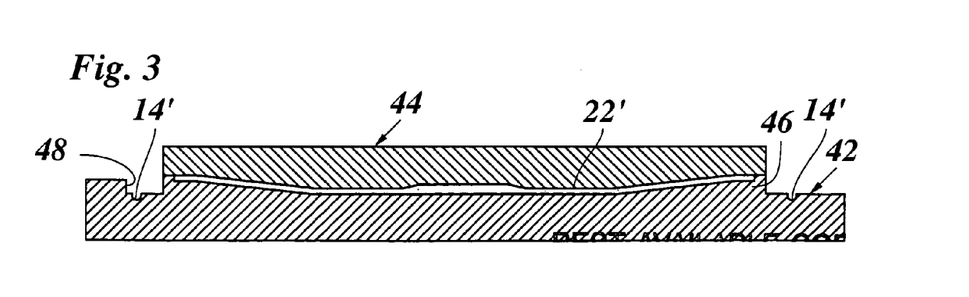

An injection mold, the lower part 42 of which is shown in FIG. 2, is used to produce the supporting element 22. FIG. 3 shows a section through the lower part 42 and of the associated upper part 44 of the mold.

The lower part 42 of the mold forms a molding cavity 22', with which the rear of the supporting element 22, which can be seen in FIG. 1, is formed. As can be seen in FIG. 3, the regions of the molding cavity 22', which form the fingers 24, are angled slightly in the upward direction. For this purpose, the lower part 42 of the mold forms plateaus 46, which rise slightly to the outside. Outside of the molding cavity 22' and the plateaus 46, the lower part 42 of the mold has a flat surface, through which longitudinal grooves 14' and transverse grooves 16', 18' pass. The longitudinal grooves 14' are deep enough to accommodate the whole of the cross section of the longitudinal rods 14. On the other hand, the transverse grooves 16', 18' are kept shallower so that they accommodate in each case only the lower half of the cross section of the transverse rode 16, 18, while the upper half of the cross section is taken up by corresponding grooves in the upper part 44 of the mold. The transverse grooves 16', 18', are limited on the left side in FIGS. 2 and 3 by a stop 48, and, on the other hand, are open on the right side to the edge of the lower part of the mold. The edge of the lower part of the mold forms a shearing edge here, at which the transverse rods 16, 18, can be sheared off. The transverse grooves 18' terminate in depressions 40' of the molding cavity 22', which correspond to the thickenings 40 of the supporting element 22.

The longitudinal grooves 14' are expanded at places into templates 50, to which in each case one bending tool 52 is assigned. Initially, the longitudinal rods 14 are introduced axially in a state, in which they are not bent, into the longitudinal grooves 14'. Alternatively, the longitudinal rods, like the transverse rods 16, 18, can be supplied as endless material against a stop and then cut to length in the mold. Subsequently, the bending tools 52 are pulled to the outside so that the bends 20 are formed in the longitudinal rods 14. The bending tools 52, which are assigned to the same longitudinal groove 14', are preferably actuated consecutively, so that the longitudinal rods 14 can be shifted axially in the longitudinal grooves 14' during the bending process, in order to compensate for the additional material required due to the bending processes 20. Subsequently the ends of the longitudinal rods 14 are bent in the manner shown in FIG. 1. Alternatively, this can also be accomplished with the help of bending tools, which are integrated in the lower part 42 of the mold.

Figure 4:
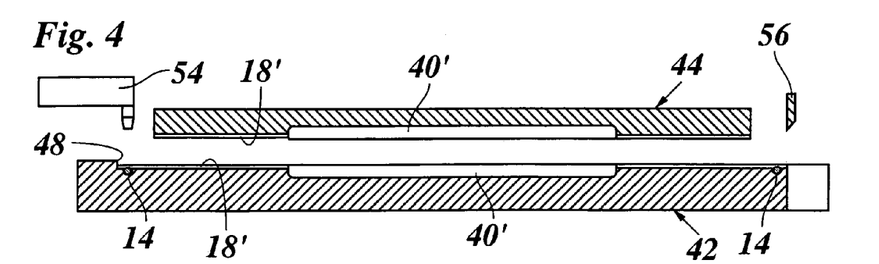
FIG. 4 shows a section through the lower part and the upper part of the mold along the line IV—IV in FIG. 2, FIGS. 5 to 8 show sections corresponding to FIG. 4 to illustrate the production process.

FIG. 4 shows a section through the opened injection mold at the height of the transverse grooves 18'. The longitudinal rods 14 have already been introduced here in the longitudinal grooves and are bent in the manner described above. At the left edge of the injection mold, a welding electrode 54 is shown, which can be moved vertically, is held at the upper part 44 of the mold and is used for welding a transverse rod 18 to the longitudinal rod 14. Corresponding welding tools are also provided for the remaining transverse rods 16, 18.

At the right edge of the injection mold in FIG. 4, a cutting knife 56 is shown, which is also held vertically movably at the upper part 44 of the mold and, together with the cutting edge of the lower part 42 of the mold, is used to cut the transverse rods 16, 18 to length.

The transverse rods 16, 18 are supplied as endless wires from the right side of the injection mold and pushed into the transverse groove 16', 18' of the lower part of the mold up to the stop 48.

Figure 5:
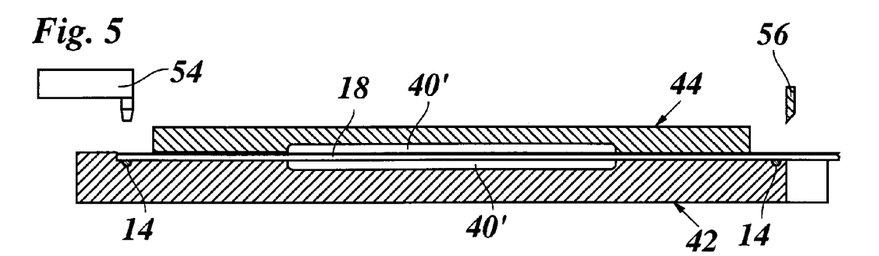

As shown in FIG. 5, the injection mold subsequently is closed so that the transverse rod 18 is held in position between the lower part 42 and the upper part 44 of the mold. The corresponding also applies for the transverse rods 16, which cannot be seen in FIG. 5. For the transverse rods 18, however, the condition applies that they can extend freely through the interior of the impressions 40' of the molding cavity.

Figure 6:
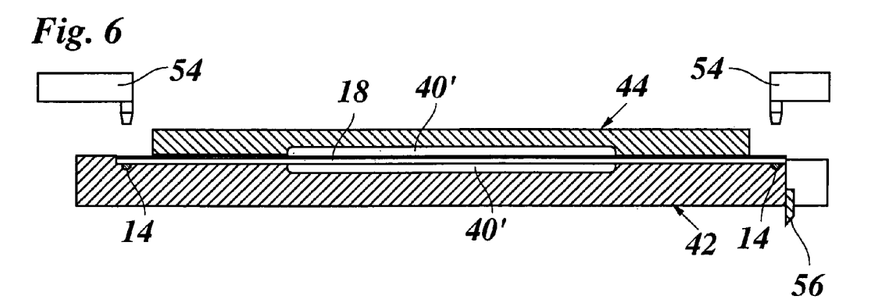
Figure 7:
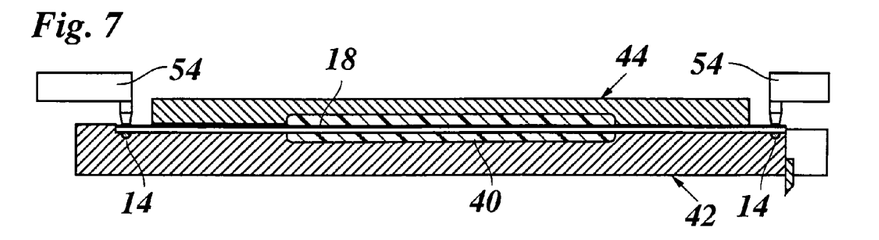
Figure 8:
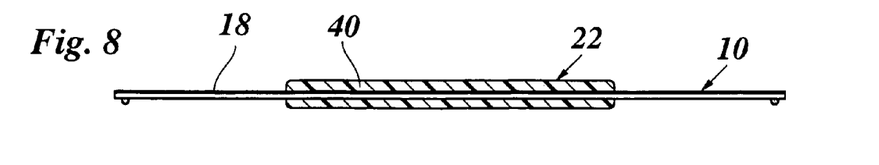

Subsequently, the cutting knife 56 is lowered in order to cut off the transverse rod 18 at the cutting edge of the lower part 42 of the mold, as shown in FIG. 6. The remaining transverse rods 16, 18, are cut to length in the same manner. A further welding electrode 54 is then brought into position above the cutting knife 56. As shown in FIG. 7, the welding electrodes 54 are then lowered in order to weld the transverse rod 18 and, correspondingly, also, the transverse rods 16 at both ends to the longitudinal rods 14. At approximately the same time, plastic melt is sprayed into the molding cavity 22', in order to form the supporting element 22. By so doing, the transverse rods 18 are encapsulated by molding with plastic melt and embedded in the thickenings 40 of the supporting element. After removal from the mold, the unit of lattice mat 10 and supporting element 22, shown in FIG. 8, is finally obtained.

Figure 9:
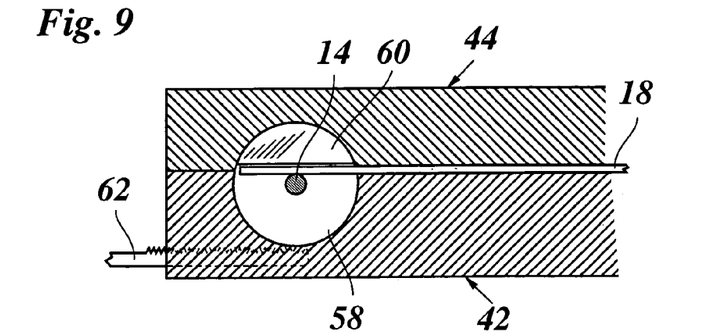
FIGS. 9 and 10 show partial sections through a device for producing the lordosis support and the lattice mat of a different embodiment of the inventive method.
Figure 10:
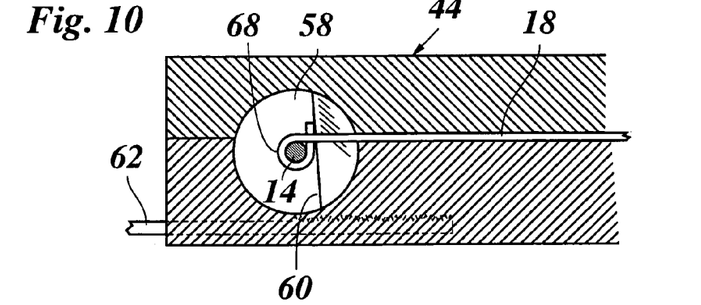
Figure 11:
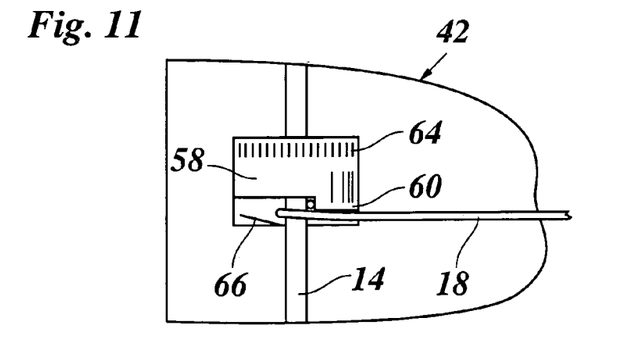
FIG. 11 shows a part of the lower part of the mold of the device of FIGS. 9 and 10 in plan view.

A modified embodiment of the invention is explained by means of FIGS. 9 to 11. This embodiment differs from the methods previously described owing to the fact that the transverse rods 16, 18 are not welded to the longitudinal rods. Instead, the ends of the transverse rods are bent into eyelets, which firmly embrace the longitudinal rods. However, the bending of the eyelets also takes place approximately simultaneously with the injection molding process. For this purpose, the upper part 44 and the lower part 42 of the mold, at the connection site between the transverse rod 18 and the longitudinal rod 14, have recesses in the shape of cylindrical segments, which, when the mold is closed, supplement one another to form a cylindrical cavity, which is centered on the longitudinal rod 14 or the associated longitudinal groove 14' of the lower part of the mold. A cylindrical bending disk 58 is mounted rotatably in this cavity and, at its end surface facing the transverse rod 18, has a protrusion 60 in the shape of a segment of a circle. In the condition, shown in FIG. 9, this protrusion 60 is completely within the upper part 44 of the mold. The transverse rod 18 is pushed into the associated transverse groove 18', until the end of this transverse rod comes up against the peripheral surface of the cylindrical cavity.

The bending disk 58 can be rotated by means of a toothed rack 62, which dips from the side into a channel (not shown) of the lower part 42 of the mold and meshes with teeth 64 on the peripheral surface of the bending disk 58. These teeth 64 can be seen in FIG. 11. Furthermore, FIG. 11 shows that the protrusion 60 is offset with respect to the transverse rod 18, so that it can rotate past the transverse rod. A leaf spring 66, which is disposed at the end surface of the cylindrical cavity in the lower part 42 of the mold, ensures that the end of the transverse rod 18 is deflected approximately in the direction of the bending disk 58, when the transverse rod 18 is introduced in the manner shown in FIG. 9. If the toothed rack 62 is now shifted in order to rotate the bending disk 58 in the counterclockwise direction, the end of the transverse rod 18 is taken hold of by the protrusion 60 and bent into an eyelet 68 closely embracing the longitudinal rod 14, as can be seen in FIG. 10. In this matter, the transverse rods 18 and correspondingly also the transverse rods 16 can be fastened stably to the associated longitudinal rods 14 during, immediately before or immediately after the injection molding process.

Figure 12:
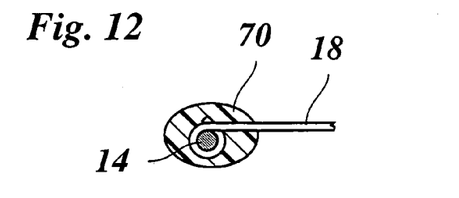
FIG. 12 shows a section through a region, in which a longitudinal rod and a transverse rod of the lattice mat are connected.
Figure 13:
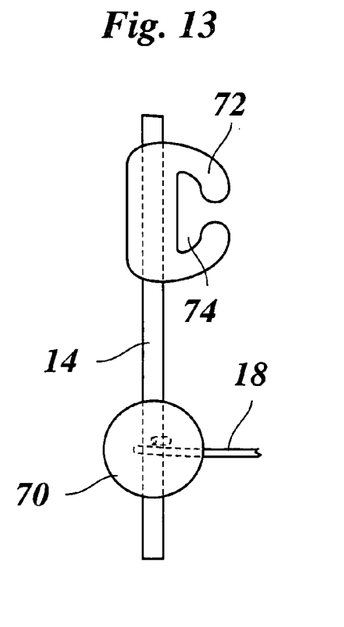
FIG. 13 shows parts of the longitudinal rod and of the transverse rod in plan view and FIGS. 14 to 16 show partial sections through a device for producing the lordosis support and the lattice mat of a further embodiment of the method.

Alternatively, the sites connecting the transverse rods 16, 18 with the longitudinal rods 14 can be encapsulated in injection molded casings 70, as shown in FIGS. 12 and 13. This is correspondingly the case also for the connection sites of FIG. 8, which are produced by welding. In the same step of the procedure, plastic anchoring sites 72, which enable the aforementioned tension springs to be hooked in and thus replace the bends 20 shown in FIG. 1, can also be gated to the longitudinal rods 14. In FIG. 13, the anchoring site 72 forms an eyelet 74 on the inside of the longitudinal rod 14, that is, on the side pointing to the center of the lattice mat. By means of this arrangement, a stable anchoring of the tension spring is made possible since the end of the tension spring, which is bent into the shape of a hook and engages the eyelet 74, also embraces the part of the anchoring site, which is reinforced by the longitudinal rod 14.

In a corresponding manner, other parts of the longitudinal and transverse rods can also be encapsulated in plastic by molding, as required, in order to fasten additional functioning parts to the lattice mat. In particular, it is possible to influence the bending behavior of the lattice mat selectively, in that the wires are encapsulated by molding with plastic casings the thickness of which varies from place to place and/or in that the transverse rods 16, 18 are connected at suitable places by spacers of plastic.

Figure 14:
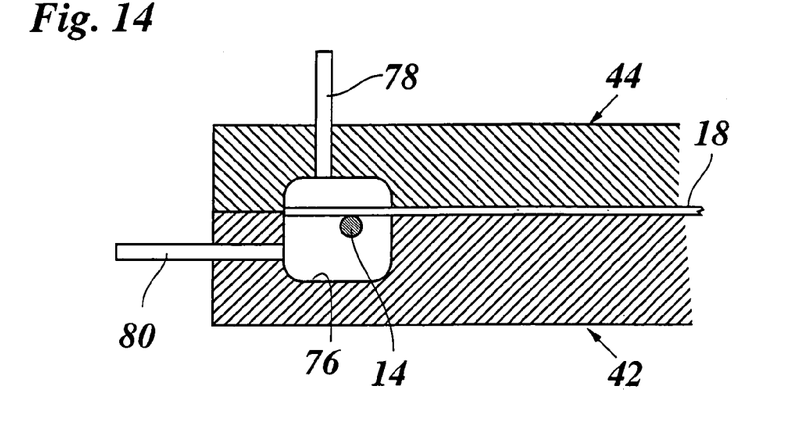
Figure 15:
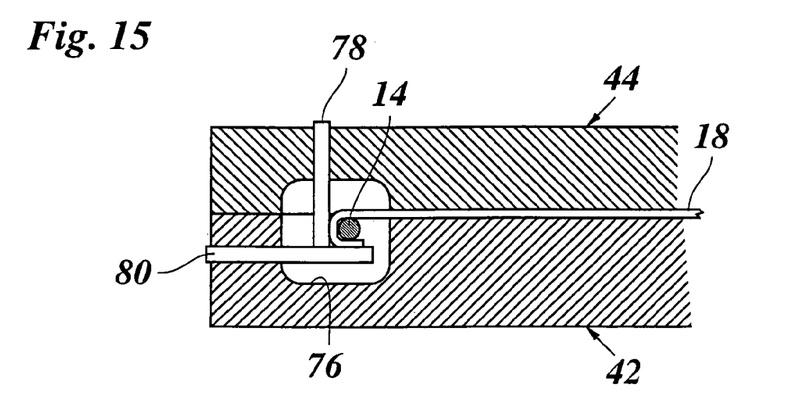
Figure 16:
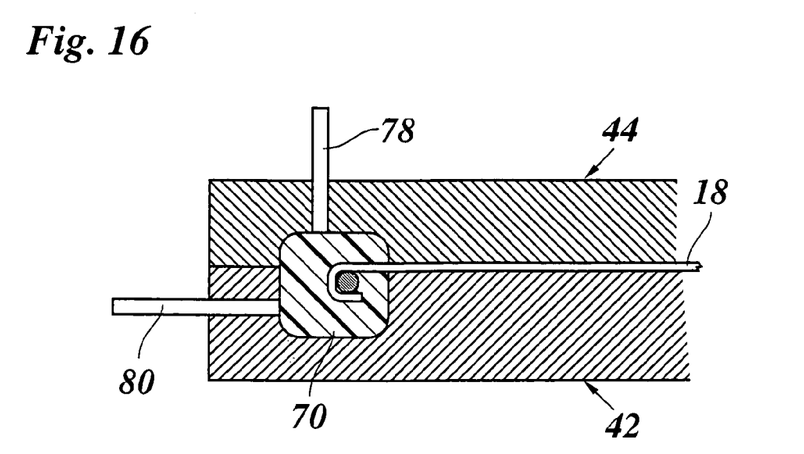

FIGS. 14 to 16 illustrate a possibility of combining the injection molding of the supporting element 22, the bending of the transverse rods 16, 18 and the encapsulation by molding of the sites connecting the transverse and longitudinal rods into a single step of the process. For this purpose, the upper part 44 and the lower part 42 of the mold form a molding cavity 76 for the encapsulation 70 at each connection site between the longitudinal rods 14 and the transverse rods 18 (or 16). According to FIG. 14, the transverse rod 18 is pushed through up to the inner wall of the molding cavity 76. While the longitudinal rod 14 is held in position by the lower part 42 of the mold, a slide 78 is lowered in the upper part 44 of the mold, so that the end of the transverse rod 18 within the molding cavity 76 is bent downward around the longitudinal rod 14. Subsequently, as shown in FIG. 15, a slide 80 of the lower part of the mold is pushed inward horizontally, in order to bend once again the end of the transverse rod 18, so that it is bent into a hook, which tightly embraces the longitudinal rod 14. Subsequently, the slides 78, 80 are retracted until they are flush with the inner surface of the molding cavity 76, and the molding cavity is filled with plastic melt in order to form the casing 70. The supporting element 22, which is not shown in FIGS. 14 to 16 and in which the transverse rods 18 are embedded, can be injection molded at the same time.

If the transverse rods 16, 18 are welded to the longitudinal rods 14, as in the example described first, the welding electrodes, as in the method shown in FIGS. 14 to 16, can be constructed so that, in the retracted state, they are flush with the inner surface of the molding cavity 76, so that the welded points can be encapsulated in this case also with a casing 70. However, for insulation purposes, the welding electrode must be guided in the upper part 44 of the mold in an insulating sleeve, the end surface of which once again forms a part of the wall of the molding cavity 76.

The invention claimed is:

1. A method of producing a lordosis support, comprising the steps of:
    introducing transverse rods and longitudinal rods of a lattice mat into an injection mold for a supporting element of a lordosis support,
    connecting together the transverse rods and longitudinal rods while in the injection mold, independently of an injection molding process therein, and
    injecting plastic melt into the injection mold to form the supporting element of the lordosis support with an adjustable curvature, wherein the plastic melt encapsulates some of the transverse rods thereby embedding them in the supporting element.

2. The method of claim 1, wherein the step of introducing includes the steps of:
    introducing the transverse rods in transverse grooves of the injection mold, and
    pushing ends of the transverse rods against a stop which is formed in the injection mold.

3. The method of claim 2, further comprising the steps of:
    supplying the transverse rods as endless material, and
    cutting off the transverse rods, when the transverse rods are fixed in contact with the stop in the injection mold, on a side of the injection mold opposite the stop, with one edge of the injection mold being used as cutting edge.

4. The method of claim 1, wherein the step of introducing includes the step of pushing the longitudinal rods into longitudinal grooves of the injection mold as straight rod endless material.

5. The method of claims 4, further comprising the step of bending the longitudinal rods in the injection mold, with a portion of the injection mold functioning as a bending template.

6. The method of claim 5, further comprising the step of preventing movement of the bent longitudinal rods before injection molding of the supporting element.

7. The method of claim 1, wherein the step of connecting together includes the step of welding the transverse rods to the longitudinal rods.

8. The method of claim 1, wherein the step of connecting together includes the step of fastening the transverse rods to the longitudinal rods by bending ends of the transverse rods around the longitudinal rods into one of eyelets and hooks.

9. A method of producing a lordosis support, comprising the steps of:
    introducing transverse rods and longitudinal rods of a lattice mat into an injection mold for a supporting element of a lordosis support, the step of introducing including the step of pushing the longitudinal rods into longitudinal grooves of the injection mold as straight rod endless material,
    connecting together the transverse rods and longitudinal rods in the injection mold,
    gating plastic parts to the longitudinal rods of the lattice mat,and
    injecting plastic melt into the injection mold to form the supporting element of the lordosis support with an adjustable curvature, wherein the plastic melt encapsulates some of the transverse rods thereby embedding them in the supporting element.

10. The method of claim 9, wherein at least some of said plastic parts are casings for connecting regions between the longitudinal rods and the transverse rods.

11. The method of claim 9, wherein at least some of the plastic parts are anchoring sites for tension springs, which are to be suspended from the longitudinal rods.

12. The method of claim 9, wherein the plastic parts are injection molded in one step with the supporting element.

* * * * *